May 30, 1939.   W. A. GIBBONS   2,160,204
INSULATION OF ELECTRICAL CONDUCTORS
Filed Dec. 3, 1936
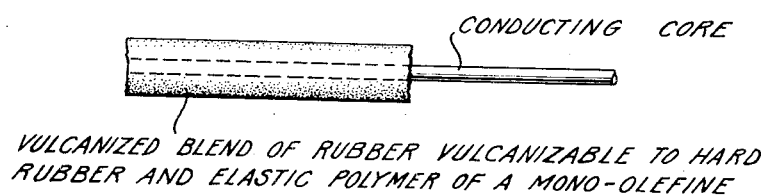
CONDUCTING CORE
VULCANIZED BLEND OF RUBBER VULCANIZABLE TO HARD RUBBER AND ELASTIC POLYMER OF A MONO-OLEFINE
INVENTOR
WILLIS A. GIBBONS
BY
Gourley & Budlong
ATTORNEYS Patented May 30, 1939

2,160,204

UNITED STATES PATENT OFFICE 2,160,204

INSULATION OF ELECTRICAL CONDUCTORS

Willis A. Gibbons, Montclair, N. J., assignor, by mesne assignments, to United States Rubber Company, New York, N. Y., a corporation of New Jersey Application December 3, 1936, Serial No. 113,999

4 Claims. (Cl. 174—125)

This invention relates to improvements in insulation of electrical conductors, and more particularly to an improved composition for the purpose.

An object of the invention is to provide a wire and cable insulation which is flexible, ozone-resistant, corona resistant, of high dielectric strength, low inductive capacity and low power factor. Other objects will be apparent from the following description.

The usual wire and cable insulation of which rubber constitutes the base is not considered safe for use at potentials in excess of about 10,000 volts. At higher voltages rubber is rapidly attacked and destroyed by the ozone generated by the corona which is associated with high voltage circuits. To overcome this tendency it has been the practice to reduce the rubber content to as low a value as possible by the addition thereto of high proportions of factice, oils, waxes, pitches, mineral fillers, and the like, whereby to improve corona resistance. Even with such addition the corona resitance is not all that is desired. The disadvantage of relatively low corona resistance applies as well to soft rubber, so compounded or uncompounded, which has an unusually low degree of cure. Hard rubber, or ebonite, is too hard and rigid to serve for the insulation of flexible conductors. Furthermore, ebonite cracks rapidly when subjected to ozone under tension.

According to the present invention, the above disadvantages and difficulties are overcome by providing the electrical conductor with an insulation comprising as constituents, rubber and an elastic high-molecular weight polymer of a purely aliphatic mono-olefine having a branched carbon chain. The rubber and the said polymer may be blended on the mill to form a homogeneous mixture, to which are added a vulcanizing agent, accelerators, pigments, or any other desired ingredients. The vulcanizable composition is then extruded onto an electrical conductor, or applied in any other suitable manner, as is known in the art, and vulcanized. The general assembly is shown in the figure of the drawing.

The amount of sulphur incorporated or present to function as the vulcanizing agent should be equal to at least 30% of the weight of the rubber, so as to confer on the rubber after cure, a vulcanization coefficient of from 30 to 47, and preferably at least 45. It is understood that the maximum value represents vulcanized hard rubber in which substantially all of the double bonds have been saturated with sulphur. Such high coefficients, for reasons aforesaid, have not been considered useable in insulation for flexible conductors. Regardless, by this invention an improved insulation is provided which while retaining the high dielectric strength, the high volume resistivity, and chemical inertness of hard rubber, at the same time is substantially completely unaffected by ozone over prolonged periods of time when subjected to corona while under a tensile stress. At the same time, the insulation is sufficiently flexible to meet the requirements for flexible conductors for high tension purposes.

Mono-olefine polymers of a molecular weight of from 500 up to at least 280,000 (measured by Staudinger's viscosity method) are known, and may be prepared in a manner known to the art, one such method being indicated in U. S. Patent 2,051,840, as applied to polymerization of a preferred mono-olefine, e. g., isobutylene, with boron trifluoride. Some of these materials are known to the trade under the names "Vistanex" "Viskanol", and "Vispranol". For the purposes of this invention, however, the mono-olefine polymers employed are those having a molecular weight on the same order as that of natural crude rubber, i. e., those polymers having a molecular weight of at least 50,000 to 150,000 and upwards. These higher polymers are similar to rubber in being highly elastic, and they are also characterized as being water-white, substantially non-tacky and odorless solid masses soluble in aliphatic hydrocarbons such as gasoline and petroleum oils, and insoluble in acetone or alcohol. They are further characterized herein as being essentially saturated hydrocarbons, that is, having a very low degree of chemical unsaturation, and as susbtantially inert to the action of corrosive chemicals including ozone.

Unlike the lower polymers such as those having molecular weights of from 1000 to 12,000, which are sticky semi-liquids, the higher polymers herein employed are millable, like rubber, and miscible therewith in all proportions, but unlike rubber, they exhibit a very high elastic recovery even after long milling and are not "broken down" or rendered permanently more plastic by either heat or milling. This property of high elastic recovery renders the polymers unsuitable per se for extrusion but when blended with rubber as aforesaid, the composition may be readily extruded without excessive shrinkage.

It is to be understood that the proportion of the polymer in the insulating composition may be varied in accordance with the conditions of use contemplated for the insulation. For example, considerable improvement in ozone-resistance results where as little as 10 parts by weight of the polymer per 100 parts by weight of the rubber, are used. Substantially complete inertness to ozone under severe conditions which result in very rapid cacking of ordinary rubber insulation, results when the insulation includes at least 100 parts of the polymer per 100 parts of the rubber, by weight. Increasing thus the proportion of the polymer also increases the degree of flexibility of the vulcanized composition. Where the proportion of the substantially non-tacky elastic polymer is at least equal to the amount of rubber, the hard rubber composition is further characterized as remaining flexible even at low temperatures such as from 0° to −40° C. This provides for a safe condition in severe cold weather, with substantially no loss of insulating value by reason of cracking of the insulation.

The insulation of the present invention, besides combining flexibility and remarkable corona resistance, are further characterized by a dielectric constant and power factor which are less than those or ordinary soft rubber insulating compounds and which, unlike the latter, remain practically constant upon long exposure to water.

Any desired vulcanization accelerator and/or age-resister may be added to the composition as well as any of the usual vulcanizing aids such as zinc oxide, fatty acids, etc.

Illustrative of a suitable composition is the following:

| | Parts by weight |
|---|---|
| Polyisobutylene | 100 |
| Rubber | 100 |
| Sulphur | 30 to 45 |
| Mercaptobenzothiazole | 2½ |
| Stearic acid | 1½ |
| Zinc oxide | 10 |

For maximum ozone resistance the proportion of sulphur based on the rubber should be on the order of 45%, whereas in other cases where it is desired to have a more flexible insulation and one with a lower power factor and lower dielectric constant, 30 to 40% sulphur is proper.

The improved insulation may be applied to all types of solid or stranded wires, and as an inner, intermediate, or outermost coating. It may also serve as a jacket surrounding twinned wires, multi-conductor cables, etc.

The term "rubber" herein is applied to caoutchouc and similar vulcanizable materials having similar properties, and is not to be confused with derivatives made from rubber as a starting material such as chlorinated rubbers. It is intended that the patent shall cover, by suitable expressions in the appended claims, whatever features of patentable novelty reside in the invention.

Having thus described my invention, what I claim and desire to protect by Letters Patent is:

1. A flexible electrical conductor comprising an insulation layer which is the product of vulcanization of a mix comprising rubber, sulphur in an amount sufficient to convert the rubber on cure to hard rubber, and an elastic high-molecular weight polymer of isobutylene.

2. An electrical conductor comprising a flexible ozone-resistant composition of high dielectric strength in which the major constituents are rubber chemically combined with at least 30% of sulphur based on the rubber, intimately associated with a substantially non-tacky elastic high-molecular weight polymer of isobutylene and in which the proportion by weight of said polymer is at least equal to the proportion of rubber.

3. A flexible ozone-resistant insulating sheath for electrical conductors covering the conducting core thereof, which sheath is the vulcanization product of a blend of a rubber composition comprising rubber and sulphur sufficient to render the rubber vulcanizable to hard rubber and an elastic high-molecular weight polymer of isobutylene.

4. A flexible ozone-resistant insulating sheath for electrical conductors covering the conducting core thereof, which sheath is the vulcanization product of a blend of a rubber composition comprising rubber and sulphur sufficient to render the rubber vulcanizable to hard rubber and an elastic high-molecular weight polymer of isobutylene having a molecular weight of at least 50,000.

WILLIS A. GIBBONS.